United States Patent
Raina (10) Patent No.: US 9,128,947 B2
(45) Date of Patent: Sep. 8, 2015

(54) QUICK RESPONSE IN SOFTWARE APPLICATIONS

(71) Applicant: Sanjay Kumar Raina, Bangalore (IN)

(72) Inventor: Sanjay Kumar Raina, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 13/918,370

(22) Filed: Jun. 14, 2013

(65) Prior Publication Data

US 2014/0367461 A1 Dec. 18, 2014

(51) Int. Cl.
*G06F 17/00* (2006.01)
*G06F 17/30* (2006.01)
*G06K 19/06* (2006.01)

(52) U.S. Cl.
CPC .... *G06F 17/30126* (2013.01); *G06K 19/06037* (2013.01); *G06K 19/06112* (2013.01)

(58) Field of Classification Search
CPC ........... G06F 17/00; G06F 17/40; G06K 7/10; G06K 9/18; G06K 19/00; G06K 19/06; G06Q 10/08; G06Q 20/3276
USPC ........ 235/375, 494, 487, 472.02, 462.09, 484
See application file for complete search history.

(56) References Cited

U.S. PATENT DOCUMENTS

| | | | |
|---|---|---|---|
| 7,124,953 B2 * | 10/2006 | Anttila et al. ............ | 235/472.02 |
| 7,290,257 B2 | 10/2007 | Henig et al. | |
| 8,292,178 B2 | 10/2012 | Chaves | |
| 8,589,431 B2 | 11/2013 | Ramaswamy et al. | |
| 2004/0046024 A1 * | 3/2004 | Natsukari et al. ............. | 235/454 |
| 2007/0152058 A1 * | 7/2007 | Yeakley et al. .......... | 235/462.01 |
| 2009/0183151 A1 | 7/2009 | Gharabally et al. | |
| 2012/0138671 A1 * | 6/2012 | Gaede et al. .................... | 235/375 |
| 2013/0026241 A1 * | 1/2013 | Sakahashi et al. ............ | 235/494 |
| 2013/0043302 A1 * | 2/2013 | Powlen et al. ................ | 235/375 |
| 2013/0087608 A1 | 4/2013 | Addy et al. | |
| 2013/0111208 A1 | 5/2013 | Sabin et al. | |
| 2013/0167143 A1 | 6/2013 | Yi | |
| 2013/0167208 A1 * | 6/2013 | Shi .................................... | 726/5 |
| 2013/0221083 A1 * | 8/2013 | Doss et al. .................... | 235/375 |
| 2013/0291074 A1 | 10/2013 | Dittrich | |
| 2014/0019958 A1 | 1/2014 | Sherman | |
| 2014/0032275 A1 | 1/2014 | Kalb et al. | |
| 2014/0053126 A1 | 2/2014 | Watson et al. | |
| 2014/0061294 A1 | 3/2014 | Kempf et al. | |
| 2014/0079374 A1 * | 3/2014 | Gehring et al. ............... | 386/296 |
| 2014/0088983 A1 | 3/2014 | Neff | |
| 2014/0110468 A1 | 4/2014 | Kandregula | |
| 2014/0206331 A1 | 7/2014 | Lee et al. | |

* cited by examiner

*Primary Examiner* — Edwyn Labaze
(74) *Attorney, Agent, or Firm* — Kenyon & Kenyon LLP (57) ABSTRACT

Embodiments of the present invention may include an apparatus and method for automatically installing mobile versions of software applications on a mobile device using quick response (QR) code technology. A software application may initially be loaded on a personal computer in response to a user request. The personal computer may determine if there is a mobile version of the software application available. If there is a mobile version available, the personal computer may generate a QR code that represents an encoded version of a link for the mobile version of the software application. Subsequently, the QR code may be displayed on a display device of the personal computer for the user to scan and access the mobile version of the software application on his/her mobile device.

26 Claims, 6 Drawing Sheets

QUICK RESPONSE IN SOFTWARE APPLICATIONS

BACKGROUND

The present invention relates to mobile platforms for enterprise applications.

With a growing reliance on mobile devices, such as smartphones and tablets, many companies are offering their enterprise software applications on mobile platforms to enable users to utilize their applications on their mobile devices. However, finding and downloading mobile applications is a cumbersome endeavor. In an enterprise setting, in order to download a mobile application on a smartphone or tablet, a user needs to know a path for an application store where the mobile applications are hosted. Alternatively, the information technology (IT) department of a given enterprise can help install the applications on the user's mobile devices. There are several problems with this traditional approach to providing mobile platforms for enterprise applications.

For example, the user is typically unaware of whether a mobile platform for a given enterprise application is even available. Even if a user knows that a mobile version of the desired enterprise application is available, he or she may be in a rush, therefore manually searching for the application or asking an IT department to help may be out of the question. From an enterprise perspective, IT administrators would need to individually install the mobile application on each device, which is extremely time consuming and tedious.

Moreover, users may need to remotely access files associated with a software application using a mobile device so they can view and/or modify the files when they are away from their personal computer. However, in order to use a mobile device to access/modify files located on their personal computer, the user must either manually enter the address of the file in the mobile device or search for the file based on his/her knowledge of the database the file is located within.

DETAILED DESCRIPTION

Embodiments of the present invention may include an apparatus and method for automatically installing mobile versions of software applications on a mobile device using quick response (QR) code technology. A software application may initially be loaded on a personal computer in response to a user request. The personal computer may determine if there is a mobile version of the software application available. If there is a mobile version available, the personal computer may generate a QR code that represents an encoded version of a link for the mobile version of the software application. Subsequently, the QR code may be displayed on a display device of the personal computer for the user to scan and access the mobile version of the software application on his/her mobile device.

Some embodiments of the present application may include an apparatus and method to enable users to access and modify files stored on their personal computer using a mobile device. In such embodiments, the user may elect to save a file on the personal computer. The personal computer may automatically generate a QR code representing a link to the file. The QR code may then be displayed on a display device to be accessed by the user using his/her mobile device. The mobile device may decode the QR code and access the file to allow the user to view and/or modify the file on the mobile device when the user is away from the personal computer. Any changes made to the file may be automatically saved, allowing the user to access the most updated version of the file on either the mobile device or the personal computer at a later time.

Figure 1:
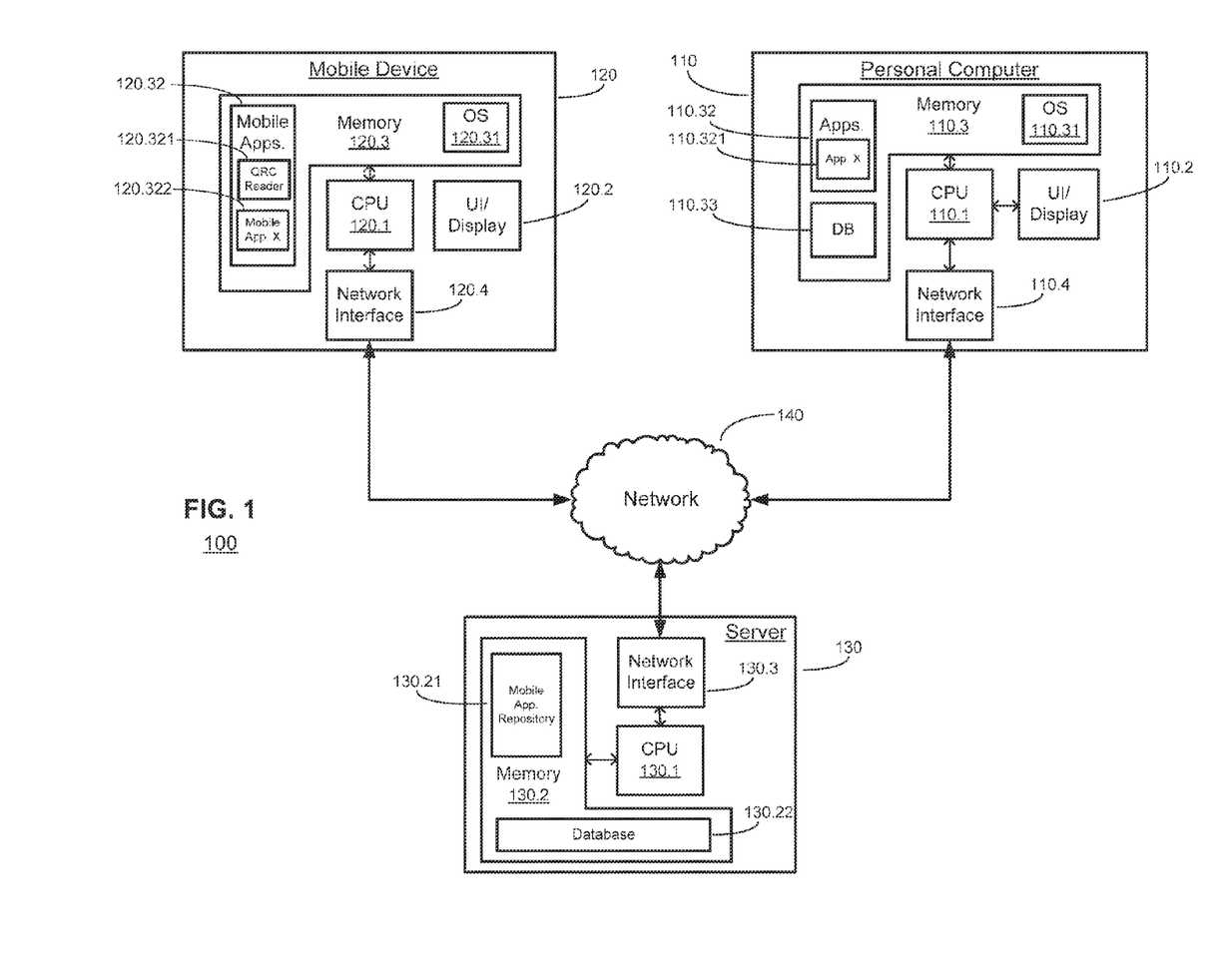
FIG. 1 is a simplified block diagram of a system implementing a quick response (QR) code according to embodiments of the present invention.

FIG. 1 is a block diagram of a system 100 according to embodiment of the present invention. System 100 may include a personal computer (PC) 110, a mobile device 120, a server 130, and a network 140. Each of the components (the PC 110, the mobile device 120, and the server 130) of the system 100 may communicate with each other over the network 140, which may be a local area network (LAN), a wireless local area network (WLAN), a wide area network (WAN), etc.

The PC 110 may be a desktop or laptop device (or other similar devices) and may include a central processing unit (CPU) 110.1, a user interface (UI) 110.2, a memory 110.3, a network interface 110.4, and other components not shown in FIG. 1 to maintain simplicity. The CPU 110.1 may access the memory 110.3 to load an operating system 110.31 stored within the memory 110.3. The CPU 110.1 may execute instructions according to the operating system 110.31 and in response to user interaction with the UI 110.2 to facilitate operation of the PC 110.

Specifically, the CPU 110.1 may access software applications 110.32 and a database 110.33 of files stored within the memory 110.3 in response to user interaction with the UI 110.2 (e.g., computer mouse, keyboard, and display/monitor). For example, a user may interact with the UI 110.2 (e.g., by using a mouse to click on an icon displayed on a monitor) to indicate a desire to open a given software application X 110.321. In response to the user's input, the CPU 110.1 may access the memory 110.3 to load the application X 110.321 and display the application for the user. The CPU 110.1 may also load files in the database 110.33 associated with the application 110.321. The user may modify the files (or create new ones) and may save the changes to the files (or the new file) in the database 110.33 within the memory 110.3.

The mobile device 120 may be a smartphone, personal digital assistance, a tablet, or the like. The mobile device 120 may include a CPU 120.1, a user interface 120.2, a memory 120.3, and a network interface 120.4. The CPU 120.1 may access the memory 120.3 to load a mobile operating system 120.31 stored within the memory 120.3. The CPU 120.1 may execute instructions according to the operating system 120.31 and in response to user interaction with the UI 120.2 to facilitate operation of the mobile device 110.

Specifically, the CPU 120.1 may access mobile software applications 120.32 (and files, not shown) stored within the memory 120.3 in response to user interaction with the UI 120.2 (e.g., a mobile keyboard, track ball, or touch screen). For example, a user may interact with the UI 120.2 (e.g., pressing an icon displayed on a touch screen) to indicate a desire to open a given mobile version of software application X 120.322. In response to the user's input, the CPU 120.1 may access the memory 120.3 to load the mobile application X 120.321 and display the application for the user.

The server 130 may include a CPU 130.1, a memory 130.2, and a network interface 130.3. The network interface 130.3 of the server and the network interfaces 110.4 and 120.4 of the PC 110 and the mobile device 120, respectively, may facilitate communication and/or data transfer between each device via the network 140. The CPU 130.1 may access the memory 130.2 which may include a mobile application repository 130.21 and a database 130.22. The mobile application repository 130.21 may include mobile application installation software used to install mobile applications on the mobile device 120. The database 130.22 may include data (including files) received from the PC 110 and the mobile device 120 over the network 140. According to embodiments of the present invention, the application repository 130.21 and the database 130.22 may be located a different servers and accessed by the PC 110 and the mobile device 120 over the network 140.

According to embodiments of the present invention, the mobile device 120 may directly access the PC 110 over the network 140. In such embodiments, instead of sending data (such as files) from the PC 110 to the server 130 to be stored and later accessed by the mobile device 120, the mobile device 120 may directly access the files on the PC 110 over the network 140 (using a virtual private network, for example). The system 100 may have various configurations to share data between the various components depending on the needs of the specific system (such as security needs).

During operation, the CPU 110.1 of the PC 110 may generate machine readable encoded images, such as quick response (QR) codes in various situations. A QR code is a machine readable data-encoded image (similar to a barcode) which can be scanned and decoded by the mobile device 120. The data extracted from the QR code pattern may be a link, such as a uniform resource locator (URL), that can be accessed by the mobile device 120 to download content. According to an embodiment of the present invention, the CPU 110.1 of the PC 110 may generate a QR code that represents a link to an installation program for a mobile version of a software application X that is running on the PC 110 (described in further detail below with respect to FIGS. 2 and 3). According to another embodiment of the present invention, the CPU 110.1 of the PC 110 may generate a QR code that represents a link to a file open on the PC 110 (described in further detail below with respect to FIGS. 4 and 5).

Figure 2:
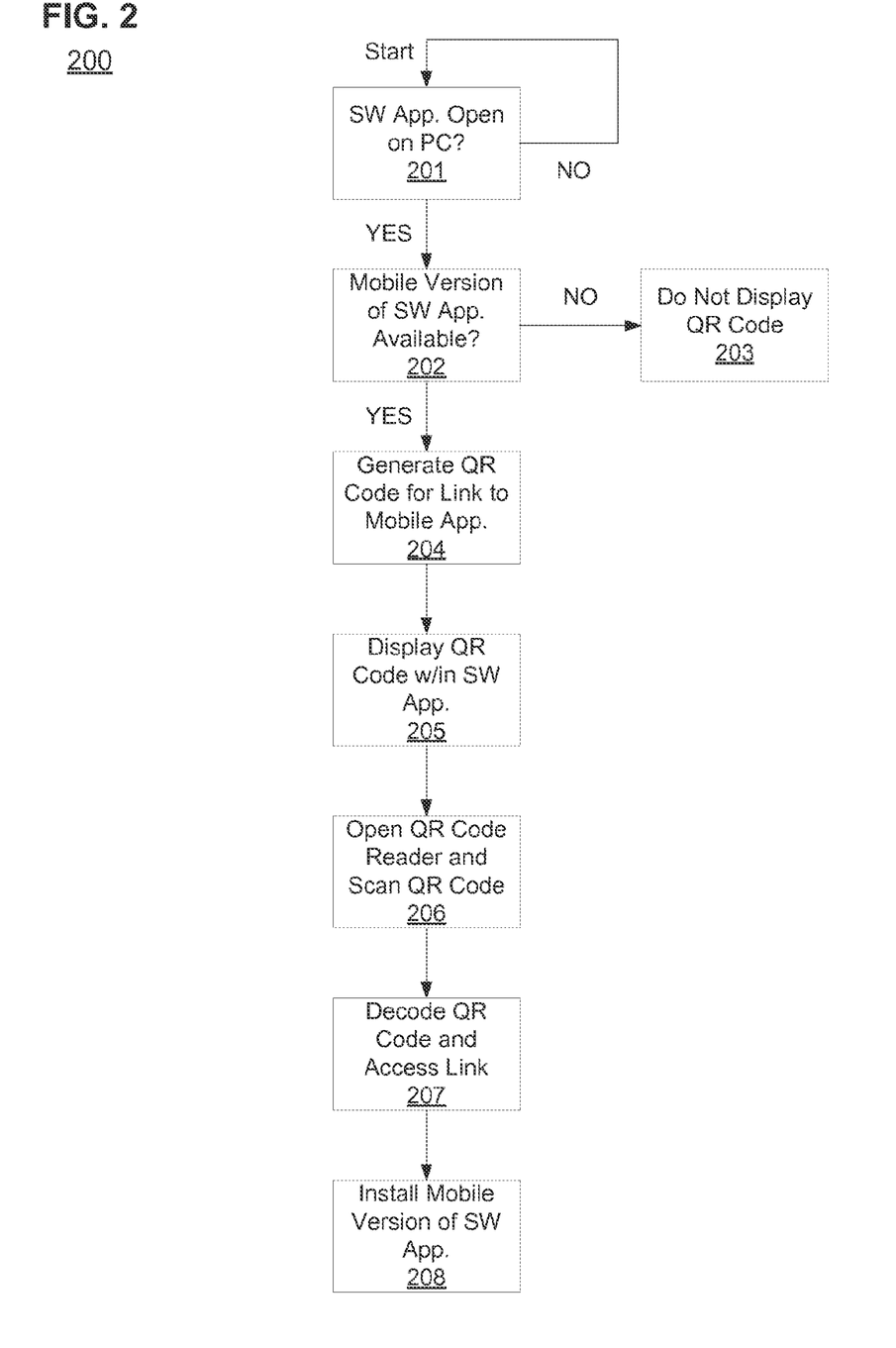
FIG. 2 is a flow chart of a method for using a QR code in a system according to embodiments of the present invention.

FIG. 2 is a flow chart 200 illustrating an operation of the system 100 in FIG. 1 according to an embodiment of the present invention. Initially, the CPU 110.1 may determine whether a software application is open on the PC 110 (step 201). If there is an application open, the CPU 110.1 may communicate with the server 130 over the network 140 to determine whether there is a mobile version of the software application (say, software application X 110.321) in the mobile application repository 130.21 (step 202). If there is not a mobile version of software application X 110.321, the CPU 110.1 may not display a QR code on the display of the UI 110.2 (step 203). If there is a mobile version of the application X 110.321, the CPU 110.1 may generate a QR code representing a link to the mobile version application X in the repository 130.21 (step 204).

The CPU 110.1 may then display the generated QR code within the software application X 110.321 on the display of the UI 110.2 (step 205). The user may open a QR code reader application 120.321 on his/her mobile device 120 and scan (using a camera of the mobile device 120, for example) the QR code displayed on the PC 110 (step 206). The CPU 120.1 may subsequently decode the QR code read by the QR code reader 120.321 and use the decoded link to access (over the network 140) the mobile version of application X in the mobile application repository 130.21 of the server 130 (step 207). The CPU 120.1 may then install the mobile version of application X 120.322 so the user may access the application on the mobile device 120 (step 208).

Figure 3:
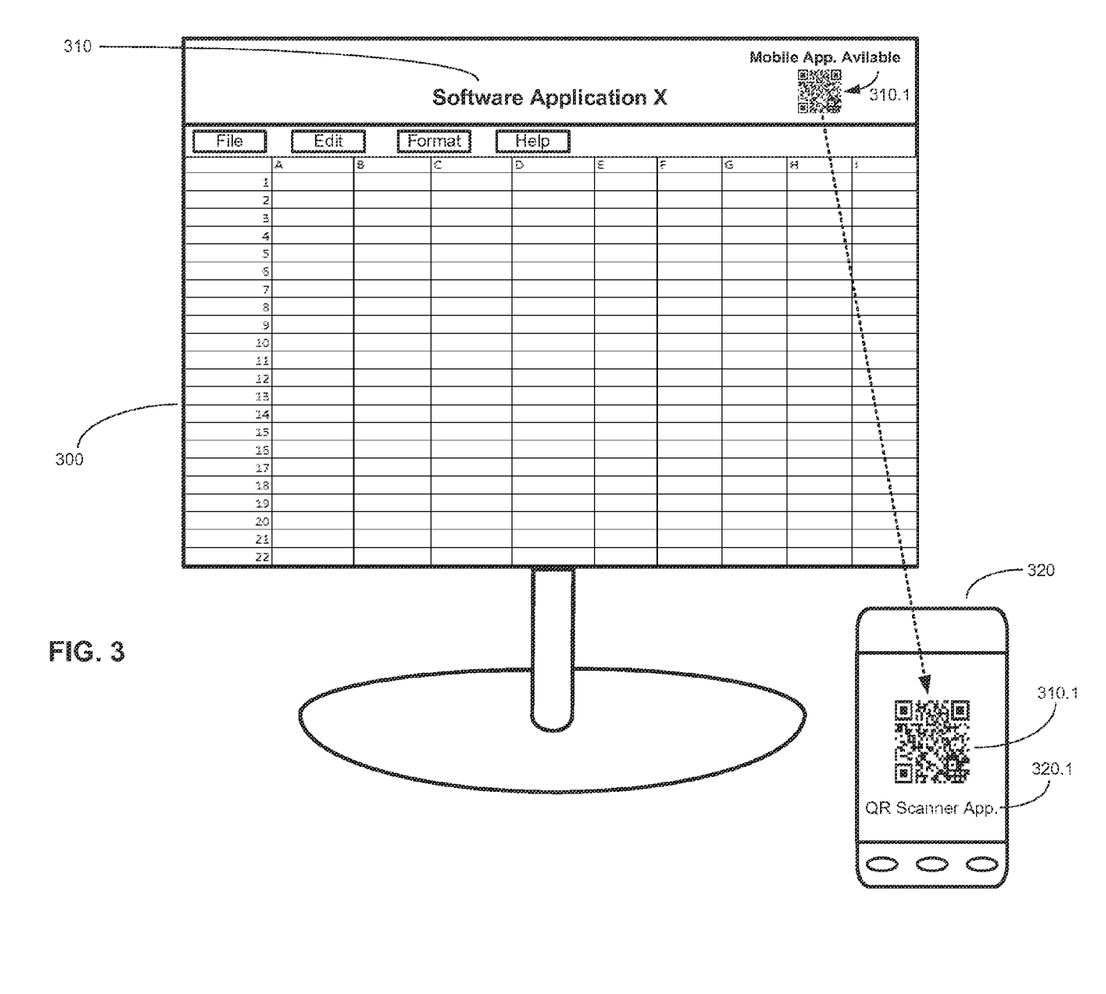
FIG. 3 is an illustration of a system implementing a QR code according to embodiments of the present invention.

FIG. 3 illustrates the operation described in FIG. 2. In the manner described above, when a software application X 310 is open on a PC 300, the PC 300 may display a QR code 310.1, indicating that a mobile version of the software application is available (if there is indeed one available). If a user desires having a mobile version of the software application X 310 on his/her mobile device 320, the user may open a QR scanner application 320.1 to read the QR code 310.1 on the PC 300. As described above, the mobile device 320 may then decode the QR code 310.1 and use the decoded link to access the mobile version of the application X 310 from a server (e.g., an application store) over a network. The user may then have an option to install the mobile version of the application X 310 and use the application as desired on his/her mobile device 320.

The embodiment described above with respect to FIGS. 2 and 3 provides an efficient manner for a user to access a mobile version of a software application. Unlike traditional approaches, the user will not have to determine whether a mobile version of a software application is available. If there is a mobile version available, the software application will display the QR code, thus automatically letting the user know that there is a mobile version available. Moreover, the user can simply scan the QR code using his/her mobile device, and the mobile version of the software application may be automatically downloaded and installed on the mobile device. IT departments may therefore no longer need to monitor the installation of such software application on mobile devices. These benefits are especially useful if a user is in a rush to install the software application on his/her mobile device.

Figure 4:
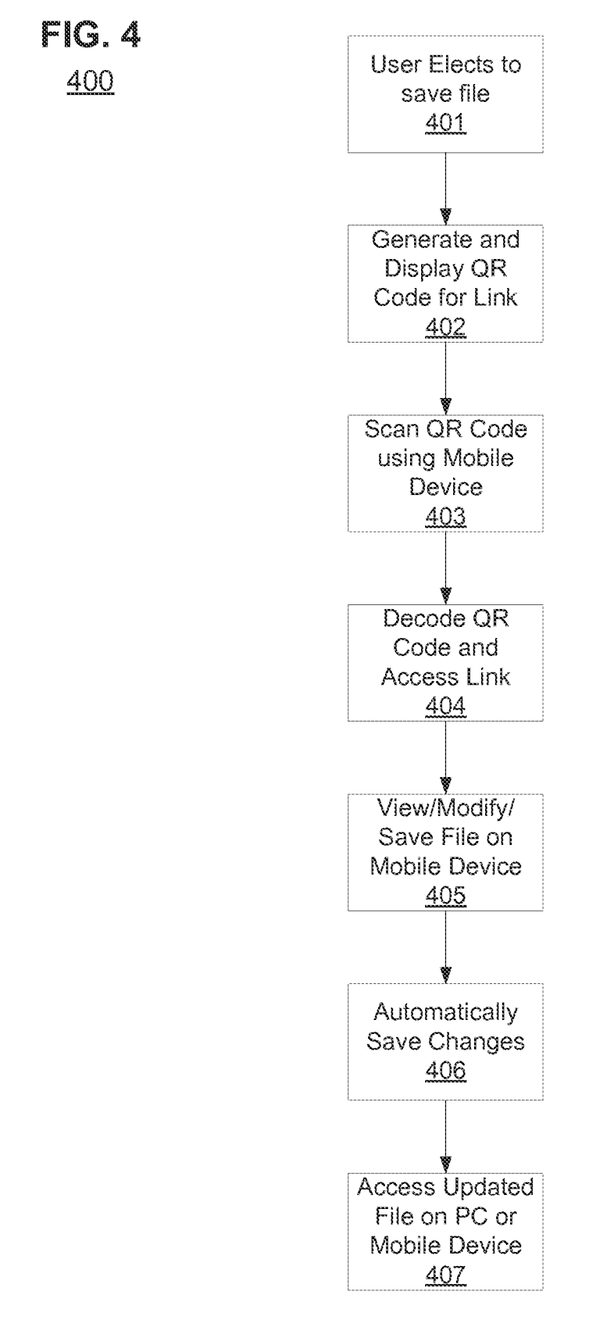
FIG. 4 is a flow chart of a method for using a QR code in a system according to embodiments of the present invention.

FIG. 4 is a flow chart 400 illustrating an operation of the system 100 in FIG. 1 according to another embodiment of the present invention. Initially, a user may elect to save an application file in the database 110.33 of the PC 110 and/or the database 130.22 of the server 130 (step 401). The CPU 110.1 of the PC 110 may then generate a QR code representing a link to the saved version of the file in the database 110.33 and/or the database 130.22 and display the code on a display of the user interface 110.2 (step 402).

The user may open a QR code reader application 120.321 on his/her mobile device 120 and scan the QR code displayed on the PC 110 (step 403). A CPU 120.1 of the mobile device 120 may decode the scanned QR code and use the decoded link to access (over a network 140) the saved file in the database 110.33 of the PC 110 and/or the database 130.22 of the server 130 (step 404). The user may subsequently view, modify, and/or save the file on the mobile device 120 (step 405). If the user modifies the contents of the file, the changes may be automatically saved at the PC 110 or the server 130 (step 406) so that the user may return to the PC 110 and access the updated file (step 407).

Figure 5:
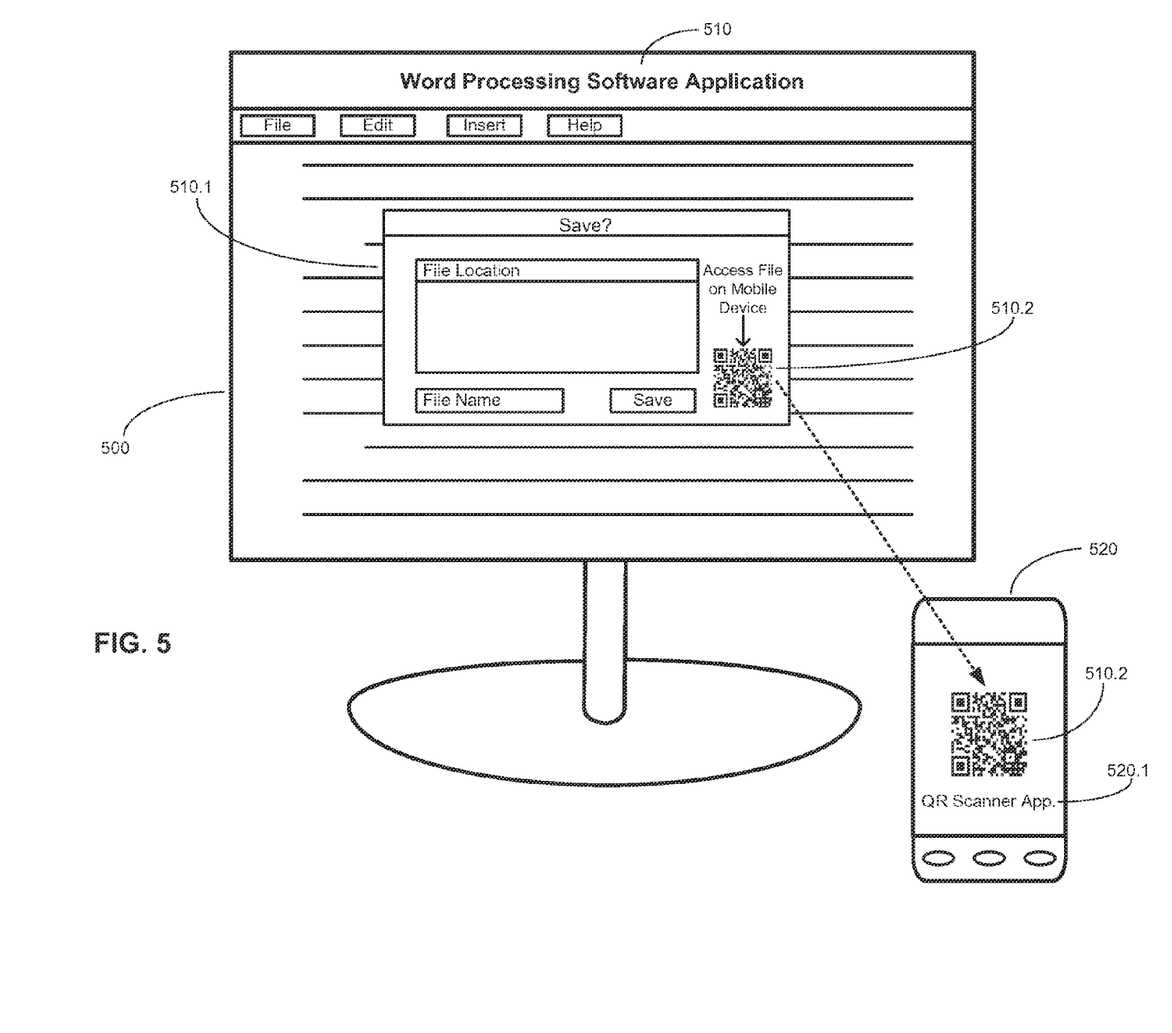
FIG. 5 is an illustration of a system implementing a QR code according to embodiments of the present invention.

FIG. 5 illustrates the operation described in FIG. 4. In the manner described above, when a file is open in a software application 510 (say, a Word Processing Software Application) and a user saves the file on a PC 500, a dialog box 510.1 may be displayed. The PC 500 may display a QR code 510.2 in the dialog box 510.1, indicating that the user may access the file on his/her mobile device 520. If the user desires to access the file on the mobile device 520, the user may open a QR scanner application 520.1 to read the QR code 510.2 on the PC 500. As described above, the mobile device 520 may then decode the QR code and use the decoded link (which may either point to a space in the memory of the PC or to a server) to access the file. The user may view/modify the file from his/her mobile device 520 as desired, and any changes to the file will be automatically saved so the user may return to the PC and access the updated file.

Figure 6:
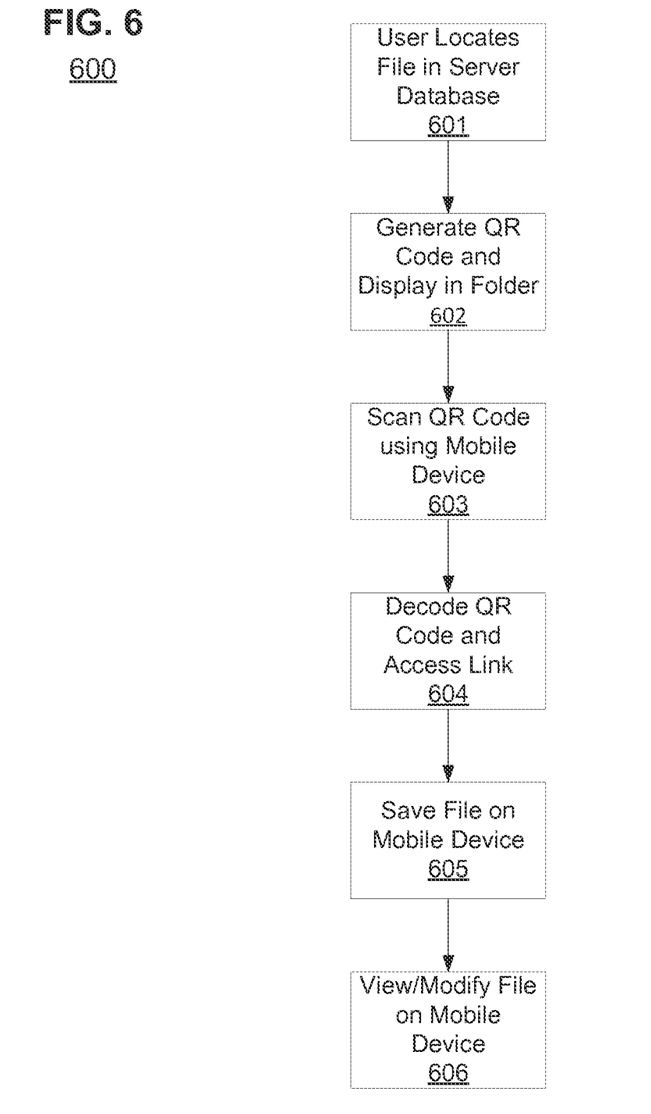
FIG. 6 is a flow chart of a method for using a QR code in a system according to embodiments of the present invention.

FIG. 6 is a flow chart 600 illustrating an operation of the system 100 in FIG. 1 according to another embodiment of the present invention. Initially, a user may elect to locate file in the database 130.22 of the server 130 over the network 140 using the user interface 110.2 of the PC 110 (step 601). The CPU 110.1 of the PC 110 or the CPU 130.1 of the server 130 may then generate a QR code representing a link to the file in the database 130.22 and display, on the display of the user interface 110.2 of the PC 110, the code in the folder the file is located at (step 602). In such an embodiment, the user may not want to open the file (say a pay stub) at the PC 110 because it may be a shared computer and the user may not want others to be able to access the file on the PC 110. Only the file name and/or information may be displayed in a folder containing the file at the database 130.22 of the server 130 (along with a list of other files in the folder).

The user may open a QR code reader application 120.321 on his/her mobile device 120 and scan the QR code displayed on the PC 110 (step 603). A CPU 120.1 of the mobile device 120 may decode the scanned QR code and use the decoded link to access (over a network 140) the file in the database 130.22 of the server 130 (step 604). The user may subsequently save the file on the mobile device 120 (step 605) and view/modify the file as the user desires (step 606).

The embodiment described above with respect to FIGS. 4-6 provides an efficient way to access files on the mobile device when a user is away from his/her PC. Instead of manually entering the address of a saved file or searching for the file on the mobile device, a user may simply scan the QR code displayed by the PC and the file will be automatically loaded onto the mobile device. Moreover, by automatically saving changes made to the draft using the mobile device, the user may always be able to access the most updated version of the file in question (whether it be on the mobile device or the PC).

Although the foregoing techniques have been described above with reference to specific embodiments, the invention is not limited to the above embodiments and the specific configurations shown in the drawings. For example, some components shown may be combined with each other as one embodiment, or a component may be divided into several subcomponents, or any other known or available component may be added. Those skilled in the art will appreciate that these techniques may be implemented in other ways without departing from the spirit and substantive features of the invention. The present embodiments are therefore to be considered in all respects as illustrative and not restrictive.

I claim:

1. A method comprising:
receiving a request, at a computer, to locate a file saved at a remote server in a folder;
displaying the folder containing the file on a display device;
generating, using the computer, a machine readable encoded image, representing a link to the file;
displaying, on the display device, the machine readable encoded image in the folder; and
automatically saving changes to the file at the remote server in response to modifications made to the file on a device that accesses the file by scanning the machine readable encoded image.

2. The method of claim 1, wherein the machine readable encoded image is a quick response (QR) code.

3. The method of claim 1, wherein the computer accesses the folder over a network.

4. The method of claim 1, further comprising:
reading and decoding the machine readable encoded image using a mobile device;
using the link to access, over a network, the file; and
saving the file at the mobile device.

5. The method of claim 4, wherein the reading comprises using a camera of the mobile device.

6. An apparatus comprising:
a processor;
a display device;
wherein the processor is configured to perform the steps of:
upon receiving a request at a computer to save a file of a software application, generating, by the computer, a machine readable encoded image representing a link to the saved version of the file; and
displaying the machine readable encoded image within a dialog box of the software application on the display device.

7. The apparatus of claim 6, wherein the file is located at a remote server.

8. The apparatus of claim 6, wherein the file is located in a memory of a personal computer on which the file is open.

9. The apparatus of claim 8, wherein,
the machine readable encoded image is read and decoded using a mobile device;
the mobile device uses the link to access the file; and
the file is automatically saved in the memory of the personal computer if any changes are made to the file using the mobile device.

10. The apparatus of claim 9, wherein the file is accessed over a network.

11. The apparatus of claim 9, wherein the mobile device reads the machine readable encoded image using a camera.

12. The apparatus of claim 6, wherein the machine readable encoded image is a quick response (QR) code.

13. A method comprising:
receiving a request, at a personal computer, representing a user's command to save a file open in a software application;
generating a quick response (QR) code, in response to the request, that represents an encoded link to the file in a machine readable medium;
displaying, on a display device, the QR code within a dialog box of the software application for a user to access;
scanning and decoding the QR code using a QR code reader on a mobile device;
accessing, over a network, a decoded link to the file to open the file on the mobile device;
modifying the file on the mobile device;
automatically updating the file in the machine readable medium to reflect the modifications made using the mobile device; and
accessing the updated file using the personal computer.

14. The method of claim 13, wherein the file is located in a memory of the personal computer.

15. The method of claim 13, wherein the file is located at a remote server.

16. The method of claim 13, wherein the scanning includes using a camera of the mobile device to read the QR code.

17. The method of claim 13, wherein the file is saved at the mobile device.

18. A method comprising:
upon receiving a request at a computer to save a file of a software application in a remote server distinct to the computer, generating, by the computer, a machine readable encoded image representing a link to the saved version of the file in the remote server;
displaying the machine readable encoded image within the software application on a display device directly connected to the computer;
scanning and decoding the machine readable encoded image using a mobile device distinct from the computer and the remote server; and
accessing, over a network, using the decoded link, the saved version of the file with the mobile device, wherein the file is (1) viewable, (2) modifiable and (3) saveable on the mobile device.

19. The method of claim 18, further comprising:
modifying the file on the mobile device; and
automatically updating the file in one of (1) the computer or (2) the remote server to reflect the modifications made using the mobile device.

20. The method of claim 18, wherein the machine readable encoded image is displayed within a dialog box of the software application.

21. The method of claim 18, wherein the machine readable encoded image is a quick response (QR) code.

22. The method of claim 18, wherein the file is also saved at the computer and the machine readable encoded image also represents a link to the saved version of the file in the computer.

23. An apparatus comprising:
a processor;
a display device;
wherein the processor is configured to perform the steps of:
upon receiving a request at a computer to save a file of a software application in a remote server distinct to the computer, generating, by the computer, a machine readable encoded image representing a link to the saved version of the file in the remote server; and
displaying the machine readable encoded image within the software application on the display device.

24. The apparatus of claim 23, wherein the machine readable encoded image is a quick response (QR) code.

25. The apparatus of claim 23, wherein the machine readable encoded image is displayed within a dialog box of the software application.

26. The apparatus of claim 23, wherein the file is also saved at the computer and the machine readable encoded image also represents a link to the saved version of the file in the computer.

* * * * *